May 11, 1965  F. M. MAYES  3,182,502
TANK GAUGE APPARATUS
Filed Jan. 24, 1962

INVENTOR.
FRED M. MAYES
BY
Busser, Smith and Harding
ATTORNEYS

United States Patent Office 3,182,502
Patented May 11, 1965

3,182,502
TANK GAUGE APPARATUS
Fred M. Mayes, Richardson, Tex., assignor to Sun Oil Company, Philadelphia, Pa., a corporation of New Jersey
Filed Jan. 24, 1962, Ser. No. 168,340
2 Claims. (Cl. 73—223)

This invention relates to tank gauge apparatus for use in determining the amount of liquid present in a tank containing liquids of different densities. While the invention as described is particularly applicable to determining the amount of oil and water in a mixture thereof contained in a tank, it will be evident that it is also applicable to the gauging of tanks containing other liquids of different densities.

Crude oil taken from an oil well is generally in a mixture containing free oil, free water and an emulsion thereof and this mixture is generally delivered to a tank. In the case of lease tanks which are cyclically filled and drained, production is metered in terms of the number of these cycles. It is thus desirable to know the amount of water and oil present in each filling of the tank. One method of accomplishing this result involves the use of separators which physically separate the oil and water by the use of de-emulsifiers. However, this method is time-consuming and expensive. It is the general object of this invention to provide a method and an apparatus for determining the amount of oil and water in a tank containing a mixture of these liquids without any separation thereof.

Figure 1:
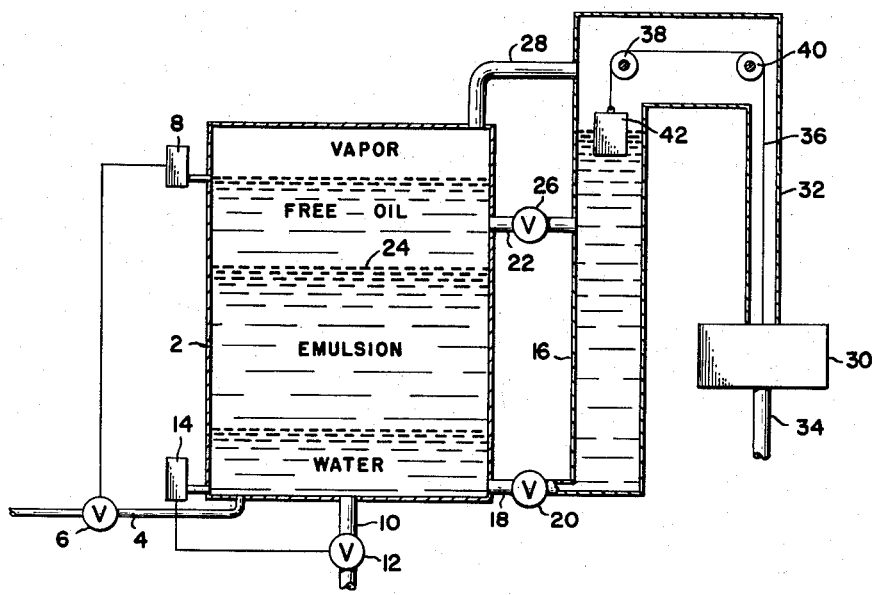
Figure 2:
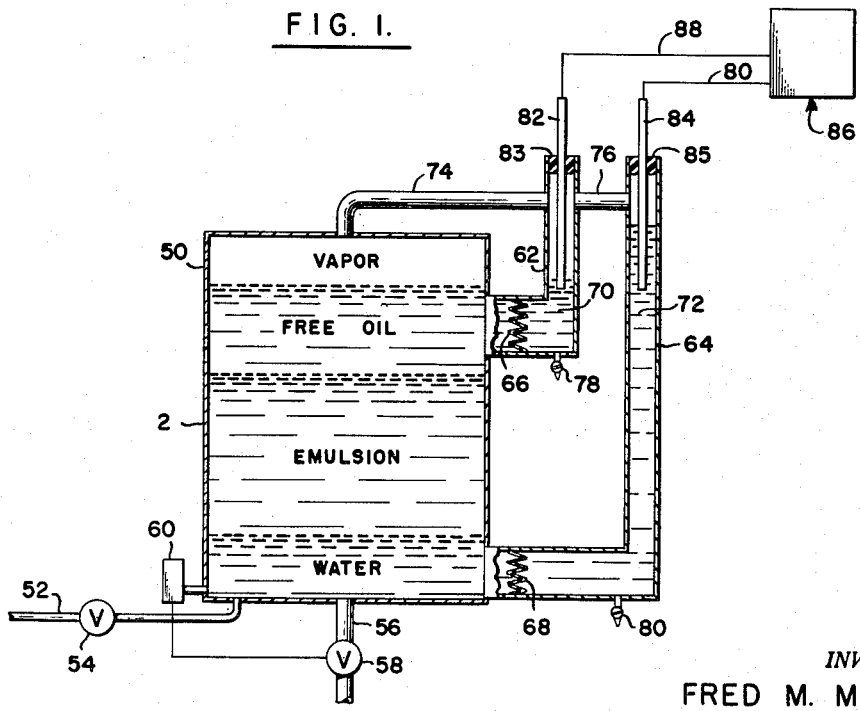

The general object of the invention as well as others relating to details will become apparent from the following description read in conjunction with the accompanying drawing in which:

FIGURE 1 is a diagrammatic sectional view of one form of apparatus in accordance with this invention; and FIGURE 2 is a diagrammatic sectional view of another form of apparatus in accordance with this invention.

Referring to FIGURE 1, there is shown therein a form of apparatus which is illustrated as applied to the determination of the quantity of oil and water in a mixture thereof contained in a tank. It will be evident, however, that the apparatus is more generally useful in that the liquids may be other fluids of different densities. For simplicity, the description will be phrased consistently with the determination of the amount of oil and water in a tank containing a mixture thereof. As shown in FIGURE 1, the mixture in the tank 2 would generally contain an upper layer of free oil, a medial layer of an emulsion of oil and water, and a bottom layer of water.

The tank 2 is filled through a conduit 4 communicating with tank 2 through the tank bottom and having a valve 6 connected therein for controlling flow therethrough. The mixture of oil and water may be pumped from a well through conduit 4 into tank 2 during the filling operation. In order to insure that the tank 2 is filled to the same level during each filling operation, there is provided a level responsive means 8 which operates to control the closing of valve 6 when the level of liquid in the tank reaches a predetermined height.

The tank 2 is drained through a conduit 10 communicating with the bottom of tank 2 and having a valve 12 connected therein for controlling flow therethrough. In order to stop the draining at a predetermined low level of liquid in the tank 2, there is provided a level responsive means 14 which is operative to control the closing of valve 12 when the level in the tank reaches a predetermined level.

Valves 6 and 12 are manually operable and may, of course, be so operated in order to control the filling and draining of tank 2. However, it is desirable to control the filling and draining by means of a level responsive means since a more accurate filling and draining may be obtained. By means of the filling and draining apparatus, the tank 2 may be cyclically filled and drained with a predetermined quantity of liquid. This cycle will be more fully described hereafter.

A gauging tube 16 extends vertically adjacent the tank 2 and is connected thereto by a conduit 18. Conduit 18 communicates with the bottom of gauging tube 16 and with tank 2 at a level such that the pressure head provided by water in a filled tank will be applied to a gauging liquid in the gauging tube 16. A valve 20 is provided in conduit 18 to control fluid flow therethrough. Conduit 22 provides communication between the gauging tube 16 and tank 2 at a level above the maximum possible level of the oil-emulsion interface 24. Conduit 22 has a valve 26 connected therein for controlling flow therethrough. The vapor spaces of the tank 2 and the gauging tube 16 are interconnected by a conduit 28 for pressure equalization.

The upper end of the gauging tube 16 is connected to the sealed compartment of a tank gauge 30 by a tube 32, the tank gauge 30 being supported adjacent the gauging tube 16 by a rod 34. A gauge wire 36 passes about a pair of pulleys 38 and 40 and is connected between a float 42 within tube 16 and the tank gauge 30. The float 42 will be supported by the liquid in the gauging tube and will indicate the level thereof.

The tank gauge 30 may be an automatic gauge or a direct reading gauge of any desired type, involving, for example, an adjustable potentiometer arrangement controlled by movements of the wire 36. One form of apparatus adaptable for use with apparatus as disclosed in FIGURE 1 is the tank gauging apparatus described in the application of Fred M. Mayes and Jack W. Jones, Serial No. 611,291, filed September 21, 1956, now Patent No. 3,034,217. In this case, wire 36 is connected to a metallic tape perforated as described in said application for the purpose of transmitting signals of the position of a float and hence the level of the liquid which supports the float.

The operating cycle is begun with the filling of tank 2. At the start of the filling operation, the tank is at its low level as determined by the level responsive means 14, valves 12 and 20 are in a closed position and the valves 6 and 26 are in an open position. The mixture of oil and water is delivered to tank 2 through the conduit 4 until the level responsive means 8 operates to close the valve 6 when the desired full level is reached in the tank 2. During the filling operation, the gauging tube 16 will become filled with free oil which passes through conduit 22 from the tank 2. No water will pass into the gauging tube 16 through conduit 22 since this conduit communicates with the tank 2 at a level above the maximum possible oil-emulsion interface 24. At the end of the filling operation, the level of the oil in the gauging tube will be the same as the level of the liquid in the tank 2 by reason of the interconnection therebetween provided by conduits 22 and 28.

The tank gauge 30 may now be operated to read the level of oil in order to check the operation of the level responsive means 8. Since the tank gauge 30 will generally provide a more accurate measurement of the liquid level, the tank gauge 30 may be used as the primary measurement for controlling the level of the liquid in tank 2.

The next step in the cycle of operation is to close the valve 26 and then to open the valve 20 so that the gauging tube 16 will serve as a manometer. With the valve 20 open there is communication between the oil in gauging tube 16 and the water at the bottom of tank 2 and an interface therebetween is formed. Since the density of the liquid in the tank 2, which contains a certain percentage of water, is greater than the density of the free oil in the gauging tube 16, some water from the bottom of tank 2 will flow into the gauging tube 16 to cause the level of the oil therein to rise. When the valve 20 is open, a manometer arrangement exists and the height of the column of oil in the gauging tube 16 will be indicative of the percentage of oil and water in the tank 20. This occurs because the height of the manometer column in the gauging tube 16 will adjust to a level at which the pressure at the bottom of the gauging tube 16 will be the same as the pressure at a location in the tank in a horizontal plan passing through the bottom of the gauging tube. This is in accordance with the well known relationship between pressure, density and vertical distance, namely, the pressure at a point in a liquid is dependent on the height of liquid above the point and the density of the liquid. It will be apparent that the greater the percentage of water in the tank, the greater will be the height of the column in the gauging tube 16. The position of the float 42, of course, is indicative of the height of the liquid column in the gauging tube 16. The tank gauge 30 is then operated to read the level of oil in the gauging tube and a record thereof is made. This record will permit calculation of the percent of water and oil in the tank. If desired, the reading of the tank gauge may be expressed in terms of barrels of oil and water present.

The above-stated relationship between the height of the oil column in gauging tube 16 and the percentage of oil and water may be demonstrated by the following equations and discussion.

It will be evident that with valve 20 open, a U-tube manometer is provided by the liquid contained in tank 2, conduit 18 and gauging tube 16. Assuming that there is a very small water head in gauging tube 16 so that the entire head in the gauging tube is provided by oil, the pressure $P_g$, at the bottom of the gauging tube 16 on a plane aligned with the low level of liquid in tank 2, may be expressed as follows, wherein $h_g$ is the height of the column of oil in the gauging tube 16 and $D_o$ is the weight-density of oil:

(1) $$P_g = h_g D_o$$

It will be apparent that Equation 1 is only an approximation since there will be a water head in the gauging tube. However, this equation may be made to be a very close approximation by constructing the gauging tube with a section of large cross-sectional area at the bottom of the gauging tube and an upper section of a relatively small cross-sectional area. By this construction the water head in gauging tube 16 will be very small in relation to the oil head.

The pressure $P_t$ at the bottom of tank 2 in the plane of the tank lower level may be expressed as follows, wherein $h_t$ is the height of the column of liquid in tank 2 above the lower tank and $D_{o-w}$ is the weight-density of oil and water in tank 2:

(2) $$P_t = h_t D_{o-w}$$

Since the pressure $P_t$ is a result of the combined effect of the pressure heads provided by the oil and water either as an emulsion or as separate columns of liquid, the pressure $P_t$ may be expressed in the following equation, wherein $f_o$ is the fraction of oil in the tank 2, $f_w$ is the fraction of water in the tank 2, $D_o$ is the weight-density of the oil, and $D_w$ is the weight-density of the water:

(3) $$P_t = h_t(f_o D_o + f_w D_w)$$

or (4) $$P_t = h_t f_o D_o + h_t f_w D_w$$

Since the pressures are equalized at the bottom of tank 2 and gauging tube 16, that is, $P_t$ is equal to $P_g$, Equation 1 and Equation 4 may be combined as follows:

(5) $$h_g D_o = h_t f_o D_o + h_t f_w D_w$$

Solving for $h_g$ we arrive at the following equation:

(6) $$h_g = h_t\left(f_o + f_w \frac{D_w}{D_o}\right)$$

Since the sum of $f_o$ and $f_w$ is equal to one, solving Equation 6 for $h_g$ in terms of $f_o$, we arrive at the following equations:

(7) $$h_g = h_t\left[f_o + (1-f_o)\frac{D_w}{D_o}\right]$$

(8) $$h_g = h_t\left[f_o - f_o\frac{D_w}{D_o} + \frac{D_w}{D_o}\right]$$

(9) $$h_g = h_t\left[f_o\left(1 - \frac{D_w}{D_o}\right) + \frac{D_w}{D_o}\right]$$

Since $D_w$ is greater than $D_o$, the term $D_w/D_o$ is greater than one whereby the expression $(1 - D_w/D_o)$ has negative sign. It will be evident from a consideration of Equation 9 that as $f_o$, the fraction of oil in tank 2, increases $h_g$, the height of the column of oil in gauging tube 16, decreases and, conversely, as $f_o$ decreases, $h_g$ increases. Since $f_o + f_w = 1$, it follows that the opposite is true of $f_w$, i.e. as $f_w$ increases, $h_g$ increases and as $f_w$ decreases, $h_g$ decreases. However, this may be demonstrated by solving Equation 6 for $h_g$ in terms of $f_w$ which results in the following equations:

(10) $$h_g = h_t\left(1 - f_w + f_w\frac{D_w}{D_o}\right)$$

(11) $$h_g = h_t\left[1 + f_w\left(\frac{D_w}{D_o} - 1\right)\right]$$

Since the expression $$\left(\frac{D_w}{D_o} - 1\right)$$

has a positive sign, it follows that $h_g$ will increase as $f_w$ increases and will decrease as $f_w$ decreases.

From the above analysis it is apparent that the height of the oil is gauging tube 16 provides an indication of the percentage of oil and water in the tank 2 and this percentage may be calculated from a knowledge of $h_g$.

In the above analysis it is assumed that the density of the water is greater than the density of the oil, the density of the oil will remain substantially constant, and there are no significant temperature variations. These assumptions are permissible from a practical standpoint.

The final step in a cycle of operation is the draining of tank 2. To effect draining, valves 12, 20 and 26 are open to permit the passage of liquid through conduits 10, 18 and 22. The draining is terminated at a predetermined low level by the closure of valve 12 in response to the controlling action of level responsive means 14. The tank 2 is now prepared for a subsequent filling operation.

Referring to FIGURE 2, there is shown therein another form of apparatus which is illustrated as applied to the determination of the amount of oil and water in a mixture thereof contained in a tank. The tank 50 is filled through a conduit 52 communicating with the tank 50 through the tank bottom and having a valve 54 connected therein for controlling flow therethrough. The tank 50 is drained through a conduit 56 communicating with the tank bottom and having a valve 58 connected therein for controlling fluid flow therethrough. In order to stop the draining at a predetermined low level of liquid in the tank 2, there is provided a level responsive means 60 which is operative to effect the closing of valve 58 when the level in the tank reaches a predetermined low level.

A pair of manometer tubes 62 and 64 are mounted on the side of tank 50 for communication therewith. The lower end of tube 62 is adapted to communicate with tank 50 at a level above the oil-emulsion interface so as to communicate only with free oil when the tank 50 is filled. The manometer tube 64 is positioned to communicate with the lower end of tank 50 to thereby communicate with water when the tank is filled. The lower ends of the tubes 62 and 64 are closed by flexible diaphragms 66 and 68, respectively. The diaphragms 66 and 68 serve to separate the gauging fluids 70 and 72 contained in tubes 62 and 64, respectively, from direct contact with the fluid in the tank 50 to thereby prevent the entrance of dirt or other particles into the gauging fluid. Diaphragms 66 and 68 are constructed with sufficient flexibility to accommodate the tank liquid which enters the gauging tubes 62 and 64 as a result of the filling of the tank 50. The gauging liquid may be of any suitable type such as oil or water.

The vapor space of the tank 50 is connected to the vapor spaces of the tubes 62 and 64 by a conduit 74 connected between tank 50 and tube 62 and a conduit 76 connected between the vapor spaces of the tubes 62 and 64. Since there may be condensation within the tubes 62 and 64, suitable drain valves 78 and 80 are provided, these valves being connected to the bottom of the tubes 62 and 64, respectively, for draining the condensate.

In order to avoid condensation in the gauging tubes 62 and 64, a flexible diaphragm may be placed in the conduit 74. This flexible diaphragm will separate the vapor in the tank 50 from contact with the vapor in the gauging tubes 62 and 64. If this construction were used, the drain valves 78 and 80 could be eliminated.

Means are provided for measurement of the upper level of the gauging liquids in the tubes 62 and 64. The means disclosed in FIGURE 2 takes the form of a capacity measuring instrument comprising a pair of capacity probes 82 and 84 mounted to project into the tubes 62 and 64 by a pair of plugs 83 and 85, respectively, for contact with the gauging liquids 70 and 72, respectively. The capacity probes 82 and 84 are connected to the capacity measuring circuits indicated generally at 86 through conductors 88 and 90, respectively. Since capacity measuring instruments of the disclosed type are well known further description thereof is deemed unnecessary. It will be evident that the capacity probes provide capacity readings which vary in accordance with the level variation in the respective tubes and are converted into liquid level readings by the measuring circuits 86. While a capacity measuring instrument is illustrated in FIGURE 2 for indicating the levels of the gauging liquids, it will be apparent that any suitable indicating means may be provided, as for example, the tank gauge arrangement shown in FIGURE 1.

The operating cycle of the form of the invention shown in FIGURE 2 is begun with the filling of tank 50. The mixture of oil and water is delivered to the tank 50 through the conduit 52 with valve 54 in the open position. The tank 50 is filled until the level in the manometer tube 62 reaches a predetermined level which is indicated by the capacity probe 82. Each filling operation is stopped at this predetermined level so that the tank 50 will be filled to the same level during each cycle of operation. The tank level will be the same each time the liquid level in the manometer tube reaches the predetermined height since the gauging liquid 70 is subjected to a pressure head provided by free oil during each filling of the tank 50.

When the tank 50 is filled, the gauging liquids in the manometer tubes 62 and 64 will reach a level in accordance with the manometer action of the tubes 62 and 64. It will be apparent that the flexible diaphragms 66 and 68 merely serve as separators between the gauging liquids 70 and 72 and the liquid within the tank 50. The level of the liquid 70 in the tube 62 will, of course, be at the same level during each filling operation. However, the level of the gauging liquid 72 will vary in accordance with the percentage of water in the tank 50. It will be evident that the higher the percentage of water in the tank 50, the higher will be the level of the liquid 72 in tank 64. The capacity measuring instrument is now operated to read the level of the liquid 72 in the tank 64. The difference in the level of the liquids 70 and 72 will allow determination of the percentage of water and oil in the tank 50 as was previously described.

The final step in a cycle of operation is the draining to the tank 50. This is accomplished by the opening of the drain valve 58 to permit passage of the liquid in tank 50 through conduit 56. The draining is terminated at a predetermined low level by the closure of valve 58 as determined by the level responsive means 60. The tank 50 is now prepared for a subsequent filling operation.

It will be obvious that various changes may be made in details of construction without departing from the invention as defined by the following claims.

What is claimed is:

1. The method of gauging the proportion of oil and water in a tank which is filled repeatedly with a mixture of oil and water which may settle in the tank in layers of free oil, an emulsion of oil and water, and free water comprising a cycle of operation including the sequential steps of filling the tank to a predetermined level with the mixture of oil and water to be gauged, connecting a vertically extending manometer tube to said tank during said filling step, the connection to said tank being located to communicate only with the free oil therein so that oil flows into said manometer tube to the same level as the mixture in the tank during filling, closing said first-mentioned connection, providing a pressure responsive connection of the lower end of said manometer tube to said tank through a second connection, said second connection communicating with said tank at a level such that the oil in the tube is responsive to the pressure head of the water in the lowermost layer of the mixture in the tank, whereby the level of the oil in the tube raises an amount in accordance with the proportion of oil and water in the tank, sensing the level of the oil in the tube for making a record of the proportion of oil and water in the tank, and draining the liquid contents of the tank and from the tube, and repeating said cycle for successive fillings of oil-water mixture whereby the amount of oil that is delivered from the tank during repeated cycles may be determined.

2. The method of gauging the proportion of oil and water in a tank which is filled repeatedly with a mixture of oil and water which may settle in the tank in layers of free oil, an emulsion of oil and water, and free water comprising a cycle of operation including the sequential steps of filling the tank to a predetermined level with the mixture of oil and water to be gauged, sensing the level of a liquid in a first vertically extending manometer tube connected at its lower end with said tank at a level at which the manometer liquid is responsive to the pressure provided by only the free oil in the upper layer, sensing the level of a liquid in a second vertically extending manometer tube connected at its lower end with said tank at a level at which the manometer liquid is responsive to the pressure provided by the water in the bottom layer, correlating said two sensed levels to provide a record of the proportion of oil and water in said mixture, and draining the oil-water mixture from the tank, and repeating said cycle for successive fillings of oil-water mixture whereby the amount of oil that is drained from the tank may be determined.

References Cited by the Examiner

UNITED STATES PATENTS

| | | | |
|---|---|---|---|
| 2,451,604 | 10/48 | Barnes | 73—438 |
| 2,526,192 | 10/50 | Battles et al. | 73—323 X |
| 2,644,329 | 7/53 | Redfield | 73—438 |
| 2,758,477 | 8/56 | Haeber | 73—438 |
| 2,817,967 | 12/57 | Meyers | 73—221 X |

RICHARD C. QUEISSER, *Primary Examiner.*

DAVID SCHONBERG, *Examiner.*